United States Patent [19]

Rek et al.

[11] 4,325,980

[45] Apr. 20, 1982

[54] PROCESS FOR PRODUCING A MARGARINE HAVING A REDUCED TENDENCY TO SPATTERING

[75] Inventors: Johannes H. M. Rek, Vlaardingen, Netherlands; Pieter M. J. Holemans, Ekeren, Belgium

[73] Assignee: Lever Brothers Company, New York, N.Y.

[21] Appl. No.: 205,370

[22] PCT Filed: Dec. 18, 1979

[86] PCT No.: PCT/EP79/00101

§ 371 Date: Aug. 14, 1980

§ 102(e) Date: Aug. 14, 1980

[87] PCT Pub. No.: WO80/01232

PCT Pub. Date: Jun. 26, 1980

[30] Foreign Application Priority Data

Dec. 20, 1978 [NL] Netherlands ............... 7812335

[51] Int. Cl.$^3$ .............................................. A23D 3/02
[52] U.S. Cl. .................................... 426/604; 426/607; 426/662
[58] Field of Search ............... 426/603, 604, 609, 610, 426/662, 663, 607

[56] References Cited

U.S. PATENT DOCUMENTS 3,619,213 11/1971 Haynes et al. ................... 426/610
3,669,681 6/1972 Sheaf et al. ................... 426/610 X

FOREIGN PATENT DOCUMENTS

| 660646 | 4/1963 | Canada | 426/604 |
| 7314934 | 6/1974 | Netherlands | 426/603 |
| 7314935 | 6/1974 | Netherlands | 426/604 |
| 7314936 | 6/1974 | Netherlands | 426/604 |
| 930371 | 7/1963 | United Kingdom | 426/603 |
| 1246078 | 9/1971 | United Kingdom . | |

Primary Examiner—Robert A. Yoncoskie
Attorney, Agent, or Firm—James J. Farrell; Melvin H. Kurtz

[57] ABSTRACT

An improved process for producing a margarine having a reduced tendency to spattering, the improvement consisting of adding separately to the oil phase effective proportions of a phosphatide and a finely divided hydrophilic metal- and/or metalloid oxide.

9 Claims, No Drawings

PROCESS FOR PRODUCING A MARGARINE HAVING A REDUCED TENDENCY TO SPATTERING

The present invention relates to a process for producing a margarine having a reduced tendency to spattering.

When margarine is used for baking, the water vaporizes as soon as the margarine has melted, and spattering occurs then to a serious degree. If no precautions are taken, the droplets of water in the margarine flow together on being heated and the larger droplets thus formed then get overheated and explode. This spattering can be reduced by the addition of, for example, lecithin or thermostable emulsifiers, as a result of which the flowing together of the droplets of water is prevented and a calmer baking picture emerges. However, the desired anti-spattering behaviour is not always obtained to a sufficient degree with such so-called anti-spattering agents. Lecithin, for example, only produces a very weak anti-spattering effect on non-salted milk margarines.

According to a process described in Netherlands patent application No. 7314936 a margarine having a reduced tendency to spattering is produced by incorporating in the oil phase a finely divided metalor metalloid oxide which was pre-treated with alcohols, fatty acids, aldehydes or lecithins in order to render the oxide hydrophobic. Specific examples mentioned in this publication are methylated silicon dioxide and lecithinated silicon dioxide. A drawback associated to the use of this method is that the anti-spattering effect achieved, diminishes on storage as time goes by as shown in a test illustrated in Example 19 of said Netherlands patent application.

Applicants have found a process which alleviates the above disadvantage to a great extent.

The improved process according to the invention for producing a water-in-oil emulsion of the margarine type, which displays a reduced tendency to spattering consists of adding separately (a) a phosphatide and (b) a hydrophilic finely divided metal-and/or metalloid oxide, into an oil phase essentially consisting of a fat or fat blend which is appropriate for producing a non-liquid margarine.

It is an essential feature of the present invention that the phosphatide and the oxide components are added separately to the oil phase. By added "separately" is meant that both components are physically separated before and during their incorporation in the oil phase and that a possible interaction between the components can consequently only occur in situ in the oil phase.

The effect achieved by adding separately both the phosphatide and the hydrophilic oxide was very surprising since addition of either only the phosphatide or only the hydrophilic oxide results in a very unsatisfactory anti-spattering behaviour. (Vide in this context the table of Examples 6–17 of NL 7314936 and the comparative Examples 10, 13, 15 and 17).

Suitable phosphatides which are preferred are those phosphatides which are obtained by treating vegetable oils in which phosphatides are present, such as soya oil, groundnut oil, sunflower oil and rapeseed oil, cottonseed oil, and the like, with steam or water and spearating out the phosphatides, which are also less accurately referred to as lecithin. Naturally, phosphatides of other origin, such as egg-yolk, or synthetically prepared phosphatides can also be used for the process according to the present invention. Further, partly hydrolysed phosphatides (i.e. phosphatides of which in at least a part of the molecules present an acyl group of the diacylglycerophosphatides has been split off), hydroxylated phosphatides and/or acylated phosphatides can be used in the process according to the invention. Also suitable are phosphatides obtained from fractionation of the above-mentioned phosphatides with a solvent or mixtures of solvents.

The phosphatides are usually added in an amount of about 0.01 to about 5% by weight, preferably between about 0.1 and about 1% by weight, based on the weight of the margarine.

The finely divided metal- and/or metalloid oxide useful for use in the process of the present invention are well-known substances. They are normally prepared by thermal decomposition (vapour phase hydrolysis) of the corresponding volatile metal and metalloid halogenides at very high temperatures (about 1100° C.), the particle size and the surface area of the oxides obtained being regulated by means of the concentration of the halogenides, the temperature and the reaction time. The bulk density is regulated by the degree of compression of the oxides obtained. These highly voluminous oxides are commercially available, for example from Joseph Crosfield and Sons, of Warrington, England, and from Degussa, in Germany, under the trade-mark "Aerosol" ®. Suitable highly voluminous silicon dioxide, aluminium oxide and mixtures thereof are sold under this name. In the U.S.A. such product, having the trademark "Cab-O-Sil", is sold by Cabot, Inc. Hightly voluminous silicon dioxide can also be prepared by the so-called precipitation method, for example by adding an alkali metal silicate solution and an acid solution to water at about 50° C., keeping the pH constant, and subsequently washing, filtering and drying the precipitate. By controlling the concentration of the reactants, the reaction time, the temperature and the pH, silicon dioxides having certain surface areas and particle sized are obtained. Highly voluminous aluminium oxide, silicon dioxide and iron oxide can likewise be prepared with the aid of vapour phase hydrolysis, as also titanium dioxide and zirconium oxide. Also mixtures of these oxides are prepared by vapour phase hydrolysis of the corresponding mixture of halogenides. Highly voluminous magnesium oxide can be prepared by calcination of magnesium hydroxide, magnesium oxalate or basic magnesium carbonate at about 600° C., followed by rapid cooling over a desiccating agent, such as phosphorous pentoxide. Highly voluminous magnesium oxide is commercially available, for example from the Chemical and Insulating Cy Ltd, Darlington, Durham, England, under the trade-mark "Darlington Magnesium Oxyd LMO/100". The oxide preferably used is highly voluminous, light silicon dioxide having the physical characteristics specified above. Mixtures of highly voluminous metal and metalloid oxides, for example a mixture of silicon dioxide and aluminium oxide, can also be used.

Applicants have found that useful hydrophilic oxides should preferably have (a) a specific surface area of at least 130 $m^2/g$. and preferably a specific surface area ranging from 200–400 $m^2/g$ and (b) a particle size ranging from 1–100 m$\mu$.

The preferred average primary particle size ranges from 5–30 m$\mu$. The average surface area can be determined by the method of Brunauer et al. (J. Am. Chem. Soc. 60 (1938) p. 309).

Suitable proportions of the hydrophilic oxide can be assessed in each particular case. Applicants have surprisingly found that in most instances proportions as low as ranging from 0.025–0.15 wt % will suffice. The preferred proportions lie between 0.05 and 0.10% by weight based on the weight of the margarine.

The margarines prepared according to the invention can be salt-free or salted milk margarines, as well as salted on non-salted water margarines.

The invention is particularly concerned with non liquid margarines or plastic margarines. By this term is meant margarines having an oil phase essentially consisting of a fact or fat blend which has a slip melting point ranging from 30°–40° C.

The proportion of oil phase in the margarine lies normally within 75–90% by weight and the proportion of the aqueous phase lies within the range of 10–25% by weight.

Applicants have further found that the particularly good anti-spattering effect could be achieved by ensuring that the pH of the aqueous phase ranges from 4.0–6.5.

The margarines produced according to the invention may include additives such as flavours, vitamines, antioxidants and the like. The margarines can be produced using techniques known per se and in this connection reference is made to the book "Margarine" by Andersen and Williams 1965.

The invention will now be illustrated in the following Examples.

EXAMPLE 1

With the aid of a Votator a margarine was prepared in the usual manner starting from 83.786% by weight of a fatty phase consisting of 20 parts coconut oil, 15 parts palm kernel oil, 15 parts palm oil, 50 parts soya oil, hydrogenated to a melting point of 32° C. ($D_0=800$, $D_{15}=550$, $D_{20}=450$, $D_{25}=250$, $D_{30}=125$, $D_{35}<25$) and 16% of an aqueous phase consisting of 50% of buttermilk and 50% of water (pH=4.6).

Before the fatty phase was emulsified with the aqueous phase, the following were added separately to the fatty phase: 0.168% by weight of raw soya phosphatide (that consisted for about ⅓ of soya oil) and 0.168% by weight of Aerosil 200 (finely divided silicon dioxide having a surface area of 200 $m^2$/gram and an average primary particle size of 16 m$\mu$).

This margarine was subjected after 3 and 10 days storage to the following spattering test: in an enameled pan with a smooth bottom surface 50 g of the margarine was heated each time to 175° C. (regulated by a thermocouple). The spattering fat was caught, at a distance of 21 cm above the pan, on a piece of paper that had been weighed beforehand. After the test the piece of paper was weighed again. The degree of spattering was determined on the basis of the increase in the weight of the paper and this was converted as follows into an assessment according to points:

10=very good anti-spattering behaviour=less than 10 mg
6=moderate anti-spattering behaviour=50-100 mg
2=very bad anti-spattering behaviour=≧500 mg.

The points in between express a corresponding spattering behavior. The results were as follows:
after 3 days storage: 10
after 10 days storage: 10.

When the test was repeated under identical conditions, but with, as the only difference, the oxide first having been mixed with the phosphatide before it was added to the fatty phase, the results of the spattering test were:
after 3 days storage: 9.5
after 10 days storage: 6.

EXAMPLE 2

A margarine was prepared having the same fat mixture and the same aqueous phase as in Example 1, and was subsequently subjected to the same spattering test. This time, however, 0.164% by weight of raw soya phosphatide and 0.05% by weight of Aerosil 300 were added separately to the fatty phase. (Aerosil 300 has a surface area of 300 $m^2$/gram and an average particle size of 8 m$\mu$).

The results of the spattering tests were:
after 2 days storage: 10
after 5 days storage: 9
after 11 days storage: 9.5.

When the test was repeated under identical conditions, but with, as only difference, the oxide first having been mixed with the phosphatide before it was added to the fatty phase, the results of the spattering test were:
after 2 days storage: 5
after 5 days storage: 6
after 11 days storage: 5.

EXAMPLE 3

The procedure of Example 1 was repeated, excepted that 0.1% by weight MgO (specific area 180 $m^2$/gram average primary particle size 86 milimicrons) was used. After a storage period of 10 days the anti-spattering behaviour was as satisfactory as in Example 1.

We claim:

1. A process for producing a water-in-oil emulsion of the margarine-type having an oil phase and an aqueous phase, said emulsion displaying a reduced tendency to spattering, wherein the oil phase and the aqueous phase are mixed and worked to produce a margarine, comprising adding at least 0.025% by weight of a hydrophilic finely divided metal oxide or hydrophilic finely divided metalloid oxide or mixtures thereof and at least 0.01% by weight of phosphatide to said oil phase, said oil phase consisting essentially of a fat or fat blend having a slip melting point of 30°–40° C., wherein said phosphatide and said hydrophilic metal oxide or said hydrophilic metalloid oxide or mixtures thereof are added separately to said oil phase to prevent interacting prior to introduction into said oil phase.

2. A process according to claim 1, in which said hydrophilic metal oxide or metalloid oxide has a specific surface area of at least 130 $m^2$/gram.

3. A process according to claim 2, in which said hydrophilic oxide has a specific area ranging from 200–400 $m^2$/gram.

4. A process according to claim 1, in which the particle size of the hydrophilic oxide ranges from 1 to 100 m$\mu$.

5. A process according to claim 1, in which the average particle size of the hydrophilic material ranges from 5–30 $\mu$m.

6. A process according to claim 1, in which 0.025 to 0.15% by weight of hydrophilic oxide is incorporated in the oil phase.

7. A process according to claim 1, in which the hydrophilic oxide is selected from the group consisting of silicon dioxide, aluminum oxide and magnesium oxide.

8. A process according to claim 1, in which 0.01 to 5% by weight of phosphatide is used.

9. A process according to claim 1, in which the oil phase is mixed with an aqueous phase having a pH ranging from 4.0–6.5.

* * * * *